(12) United States Patent
Azvine et al.

(10) Patent No.: US 7,743,078 B2
(45) Date of Patent: Jun. 22, 2010

(54) DATABASE MANAGEMENT

(75) Inventors: Behnam Azvine, Ipswich (GB); Trevor P Martin, Dursley (GB)

(73) Assignee: British Telecommunications Public Limited Company, London (GB)

( * ) Notice: Subject to any disclaimer, the term of this patent is extended or adjusted under 35 U.S.C. 154(b) by 455 days.

(21) Appl. No.: 11/886,737

(22) PCT Filed: Mar. 22, 2006

(86) PCT No.: PCT/GB2006/001050
§ 371 (c)(1),
(2), (4) Date: Sep. 20, 2007

(87) PCT Pub. No.: WO2006/103398
PCT Pub. Date: Oct. 5, 2006

(65) Prior Publication Data
US 2009/0234869 A1 Sep. 17, 2009

(30) Foreign Application Priority Data
Mar. 29, 2005 (EP) .................................. 05251932

(51) Int. Cl.
*G06F 17/30* (2006.01)
*G06F 15/18* (2006.01)
*G06F 17/00* (2006.01)
(52) U.S. Cl. ............................ 707/803; 706/12; 706/46
(58) Field of Classification Search .................... 707/1, 707/10, 100; 706/12, 46
See application file for complete search history.

(56) References Cited
U.S. PATENT DOCUMENTS 5,524,176 A 6/1996 Narita et al.
5,577,169 A 11/1996 Prezioso (Continued)

FOREIGN PATENT DOCUMENTS

DE 19537010 A1 4/1997

(Continued)

OTHER PUBLICATIONS

Smith C. U. et al, "Software Performance Engineering: A Case Study Including Performance Comparison With Design Alternatives," IEEE Transactions on Software Engineering, IEEE Inc., New York, US, vol. 19, No. 7, Jul. 1, 1993, pp. 720-741; XP000413274.

(Continued)

*Primary Examiner*—Hosain T Alam
*Assistant Examiner*—Navneet K Ahluwalia
(74) *Attorney, Agent, or Firm*—Nixon & Vanderhye P.C.

(57) ABSTRACT

A method of operating a database management system for integrating data from a plurality of data sources comprising steps of:
(a) selecting initial attributes for first and second data sources;
(b) selecting a candidate matching function relating to a possible mapping between data in said first and second data sources;
(c) applying said candidate matching function to data in said first data source to create possible data for said second data source;
(d) deriving a disparity measure relating to an amount of disparity therebetween;
(e) selecting different candidate matching functions and repeating steps (c) and (d);
(f) designating a candidate matching function having a disparity measure indicative of the lowest amount of disparity as a probable candidate matching function;
(g) selecting further attributes and performing steps (b) to (f) in respect thereof; and
(h) determining a probable correspondence between data objects of said first and second data sources.

20 Claims, 3 Drawing Sheets

U.S. PATENT DOCUMENTS

| | | | |
|---|---|---|---|
| 5,721,903 | A | 2/1998 | Anand et al. |
| 5,724,488 | A | 3/1998 | Prezioso |
| 5,819,033 | A | 10/1998 | Caccavale et al. |
| 6,078,924 | A | 6/2000 | Ainsbury et al. |
| 6,236,978 | B1 | 5/2001 | Tuzhilin |
| 6,760,684 | B1 | 7/2004 | Yang et al. |
| 6,839,680 | B1 | 1/2005 | Liu et al. |
| 6,871,186 | B1 | 3/2005 | Tuzhilin et al. |
| 7,272,586 | B2 | 9/2007 | Nauck et al. |
| 2003/0037063 | A1 | 2/2003 | Schwartz |
| 2004/0158567 | A1 | 8/2004 | Dettinger et al. |
| 2005/0055369 | A1 | 3/2005 | Gorelik et al. |
| 2005/0060332 | A1 | 3/2005 | Bernstein et al. |

FOREIGN PATENT DOCUMENTS

| | | |
|---|---|---|
| DE | 19914277 A1 | 10/2000 |
| EP | 0 681 249 A2 | 11/1995 |
| EP | 1 081 622 A2 | 7/2001 |
| WO | WO 95/02855 | 1/1995 |
| WO | WO 96/14608 | 5/1996 |
| WO | WO 02/077879 A1 | 10/2002 |
| WO | WO 03/003811 A1 | 1/2003 |

OTHER PUBLICATIONS

Smith C. U. et al., "Performance Engineering Evaluation of Object-Oriented Systems with SPE*ED," Internet, Dec. 31, 1997, pp. 1-21, XP002349373, http://www.perfeng.com/papers/too1s97.pdf.

Steigner C. et al., "Performance Tuning of Distributed Applications with CoSMoS," Proceedings 21$^{st}$ International Conference on Distributed Computing Systems 16-19, Apr. 2001, Mesa, AZ, USA, Apr. 19, 2001, pp. 173-180, XP002349374.

International Search Report dated Jan. 4, 2007 in International Application No. PCT/GB2006/000674.

European Search Report dated Oct. 17, 2005 in Application No. EP 05 25 1582.

European Search Report dated Oct. 17, 2005 in Application No. EP 05 25 1583.

Liggesmeyer, "Selecting Engineering Techniques using Fuzzy Logic Based Decision Support", Engineering of Computer-Based Systems, 1996. Proceedings., IEEE Symposium and Workshop on Friedrichshafen, Germany, Mar. 11-15, 1996, Los Alamitos, CA, USA, IEEE Comput. Soc., US, Mar. 11, 1996, pp. 427-434, XP010159694.

Lelescu et al., "Approximate Retrieval From Multimedia Databases Using Relevance Feedback", String Processing and Information Retrieval Symposium, 1999 and International Workshop on Groupware Cancun, Mexico Sep. 22-24, 1999, Los Alamitos, CA, USA, IEEE Comput. Soc., US, Sep. 22, 1999, pp. 215-223, XP010353490.

Medasani et al., "A Fuzzy Approach to Content-based Image Retrieval", Fuzzy Systems Conference Proceedings, 1999, FUZZ-IEEE '99, 1999 IEEE International Seoul, South Korea Aug. 22-25, 1999, Piscataway, NJ, USA, IEEE, US, Aug. 22, 1999, pp. 1251-1260, XP010350791.

Frigui, "Adaptive Image Retrieval Using the Fuzzy Integral", North American Fuzzy Information, 1999, Piscataway, NJ, USA, IEEE, US, Jun. 10, 1999, pp. 575-579, XP010342957.

Nauck et al., "Obtaining Interpretable Fuzzy Classification Rules from Medical Data", Artificial Intelligence in Medicine, Jun. 1999, Elsevier, Netherlands, vol. 16, No. 2, pp. 149-169, XP002209444.

Nauck et al., "Neuro-Fuzzy Systems for Function Approximation", Fuzzy Sets and Systems, North-Holland, Amsterdam, NL., vol. 101, No. 2, Jan. 16, 1999, pp. 261-271, XP004158428.

Kors et al., Induction of Decision Rules that Fulfil User-Specified Performance Requirements Pattern Recognition Letters, North-Holland Publ. Amsterdam, NL., vol. 18, No. 11-13, Nov. 1, 1997, pp. 1187-1195, XP004117917.

Dickerson et al, "Fuzzy Network Profiling for Intrusion Detection", IEEE NAFIPS, Jul. 2000.

European Search Report dated Aug. 9, 2002 from EP 01308260.

European Search Report dated Jul. 11, 2002 from EP 01308280.

European Search Report dated May 21, 2002 from EP 01308261.

International Search Report dated Jul. 8, 2004 from PCT/GB 02/04328.

EPO Search report for corresponding EP App. 05252068.1-2218, Jun. 22, 2005.

PCT International Search Report for parent PCT/GB2006/001022, Jun. 23, 2006.

Elomaa et al., "General and Efficient Multisplitting of Numerical Attributes," Machine Learning, vol. 36, pp. 201-244, 1999, XP009048584.

Elomaa et al., "Efficient Multisplitting Revisited: *Optima-Preserving Elimination of Partition Candidates*," Data Mining and Knowledge Discovery, pp. 97-126, 2004, XP002330976.

Zeidler J. et al., "Fuzzy Decision Trees and Numerical Attributes," Fuzzy Systems, 1996, Proceedings of the Fifth IEEE International Conference on New Orleans, LA, USA, New York, NY, USA, IEEE, U.S. vol. 2, Sep. 8, 1996, XP010195828.

Peng Y. et al., "Soft Discretization to Enhance the Continuous Decision Tree Induction," Integrating Aspects of Data Mining, Decision Support and Meta-Learning, ECML PKDD Workshop Notes, pp. 1-11, Sep. 2001XP002330977.

Zadeh, L.A., "Fuzzy Sets," Inform. Control, vol. 8, pp. 338-353, 1965.

Nauck et al., "Foundations of Neuro-Fuzzy Systems," Wiley Chichester, 1997 (Abstract of book provided; see relevance, p. 2 of specification).

Fayyad et al., "On the Handling of Continuous-Valued Attributes in Decision Tree Generation," Machine Learning, vol. 8, pp. 87-102, 1992.

Elomaa et al. "Finding Optimal Multi-Splits for Numerical Attributes in Decision Tree Learning," NeuroCOLT Technical Report Series NC-TR-96-041, Department of Computer Science, Royal Holloway University of London, 1996.

Kuncheva, L., "How good are fuzzy if-then classifiers?," IEEE Transactions on Systems, Man, and Cybernetics, Part B: 30, pp. 501-509, 2000.

Gal, A. et al, "A Framework for Modeling and Evaluating Automatic Semantic Reconciliation," VLDB Journal (2005), vol. 14, No. 1, Dec. 19, 2003, pp. 50-67.

Gal, A. et al, "Automatic Ontology Matching using Application Semantics," published on the Internet, Online! 2003, pp. 1-16, XP002339557; http://iew3.technion.ac.il/OntoBuilder/Data/10.0ntoBuilder_ Papers/dis.pdf; also published in AI Magazine, Spring 2005, vol. 26, Issue 1, pp. 21-31, American Association for Artificial Intelligence, Menlo Park, CA, USA.

Rahm E. et al, "A Survey of Approaches to Automatic Schema Matching," VLDB Journal, vol. 10, No. 4 (Dec. 2001), pp. 334-350, XP002263938; Published online: Nov. 21, 2001, Springer Verlag, Berlin, DE.

Ying Ding et al, "Ontology Research and Development: Part 2—A Review of Ontology mapping and evolving," Journal of Information Science, North-Holland, Amsterdam, NL, vol. 28, No. 5, 2002, pp. 375-388.

European Search Report dated Aug. 17, 2005 in EP 05251932 and EPO Communication dated Aug. 26, 2005 in EP 05251932.9 transmitting the European search report.

International Search Report dated May 17, 2006 in PCT/GB2006/001050.

Elfeky M. G. et al, "Tailor: A Record Linkage Toolbox," Proceedings of the 18$^{th}$ International Conference on Data Engineering (ICDE 2002), San Jose, CA, IEEE Computer Society.

Proceedings of IJCAI-03 Workshop on Information Integration on the Web (IIWeb-03), Aug. 9-10, 2003, Acapulco, Mexico.

Newcombe, H. B. et al, "Automatic Linkage of Vital Records," Science, 1959, vol. 130, pp. 954-959.

Fellegi, I. P. et al, "A theory for Record Linkage," J. American Statistical Assoc., 1969, vol. 64, No. 328, pp. 1183-1210.

Dey, D. et al., "A Distance-Based Approach to Entity Reconciliation in Heterogeneous Databases," IEEE Transactions on Knowledge and Data Engineering, 2002, 14(3), pp. 567-582.

Bilenko, M. et al., "Adaptive Name Matching in Information Integration," IEEE Intelligent Systems, 2003, 18, pp. 16-23.

Madhavan, J. et al., "Generic Schema Matching with Cupid," Proceedings of the 27th International Conference on Very Large Data Bases, Rome, Italy, 2001, pp. 49-58.

Doan, A. et al., "Learning to Match the Schemas of Data Sources: A Multistrategy Approach," Machine Learning, 2003, 50(3), pp. 279-301.

Modica, G. et al., "The Use of Machine-Generated Ontologies in Dynamic Information Seeking," Lecture Notes in Computer Science, 2001 (2172), pp. 433-448.

Noy, N.F. et al., "The Prompt suite: interactive tools for ontology merging and mapping," Stanford Medical Informatics, Stanford University, Aug. 5, 2003, http://smi.stanford.edu/smi-web/reports/SMI-2003-0973.pdf.

Berlin, J. et al., "Autoplex: Automated Discovery of Content for Virtual Databases," Lecture notes in Computer Science, 2001 (2172), pp. 108-122.

Gal, A. et al., "A Model for Schema Integration in Heterogeneous Databases," Proceedings of the Seventh International Database Engineering and Applications Symposium (IDEAS '03), 2003, Hong Kong, IEEE Press.

DATABASE MANAGEMENT

This application is the US national phase of international application PCT/GB2006/001050 filed 22 Mar. 2006 which designated the U.S. and claims benefit of EP 05251932.9, dated 29 Mar. 2005, the entire content of which is hereby incorporated by reference.

This application is also related to commonly assigned and filed U.S. patent application Ser. Nos. 11/884,461 filed Aug. 16, 2007, 11/886,737 filed Sep. 20, 2007, and 10/488,782, filed Mar. 5, 2004, now U.S. Pat. No. 7,272,586 issued Sep. 18, 2007.

TECHNICAL FIELD

The present invention relates to database management methods and systems, and more specifically to methods of operating a database management system for integrating data from a plurality of data sources.

BACKGROUND TO THE INVENTION AND PRIOR ART

The problem of integrating data from multiple sources is becoming more acute, with the increasing spread of electronic data storage. According to the foreword of the recent IJCAI-03 Workshop on Information Integration on the Web:
"Effective integration of heterogeneous databases and information sources has been cited as the most pressing challenge in spheres as diverse as corporate data management, homeland security, counter-terrorism and the human genome project. An important impediment to scaling up integration frameworks to large-scale applications has been the fact that the autonomous and decentralized nature of the data sources constrains the mediators to operate with very little information about the structure, scope, profile, quality and inter-relations of the information sources they are trying to integrate."
(See: www.isi.edu/info-agents/workshops/ijcai03/proceedings.htm)

The problem has a long history and has been considered from two perspectives—instance (or record)-based and schema (or ontology)-based approaches. The term "schema" can be taken to mean a framework for representing information about real world objects (for example, employees) in a computerised information storage system. A schema comprises (in general) a number of attributes applicable to each object (such as payroll number, first name, surname, age, etc.), and possibly information about restrictions on the values of attributes. A data source is a representation of a set of objects by means of their associated attributed values.

The problem of record linkage was identified in the USA public health area, when combining different records that (possibly) referred to the same patient. Newcombe [1] proposed a frequency-based approach which was later formalised by Fellegi and Sunter [2]. These approaches assume that the two data sources have common attributes, and are commonly applied to the so-called "merge/purge" problem in business databases to filter out duplicate entries. The methods focus on calculating a weight for each attribute in the database, according to the likelihood of finding matching values within that attribute's domain (i.e. the set of all values appearing in the column).

The initial formulation treated binary matches (true/false) but was extended to categorical matches (one of a small set of values) and continuous matches (e.g. a number in the interval [0, 1]). By assuming conditional independence between records matching on different attributes it is possible to estimate the conditional probabilities for each attribute matching, given that the records are (or are not) identical, and hence to find thresholds for classifying two records as matching or not according to the weighted sum of matches. The estimation can be on the basis of minimum error probabilities, expectation maximisation, utility (cost of incorrect decision) etc—see [3] for an overview.

These methods implicitly take into account knowledge of the database schema, as they assume each record consists of the same set of attributes.

The record linkage problem was extended to analytic linkage (also referred to as entity matching) by considering the combination of data taken from two or more sources e.g. the integration of heterogeneous databases. Dey et al [4] give a summary of probabilistic approaches, based on the same framework as the record linkage work outlined in the previous paragraph. Again, knowledge of the schema is assumed in that matching pairs of attributes are known.

These methods use several techniques to try to match attributes, such as standardising the form of names and addresses, and applying heuristics (for example first-n-characters match, common substrings, edit distance is below a specified threshold). Bilenko, Mooney et al [5] describe "SoftTF-IDF", an adaptive matching function, which takes account of the frequencies of similar and identical words within a domain.

The problem can also be approached at the schema level, by looking at labels (i.e. attribute names) and constraints associated with allowed values.

Several tools have been proposed to aid in the automation of this problem, including
Cupid [6]
Glue [7]
OntoBuilder [8]
Prompt [9]
Rahm and Bernstein [10] survey some of these tools and classify schema-matching into three main groups, with methods arising from the fields of:
information retrieval—using distance-based matching techniques such as the edit distance to overcome the inadequacy of exact, "keyword-based" matching. These assume the use of fairly simple mappings between attribute domains.
machine learning—using algorithms to create a mapping between attributes based on the similarity among their associated values. Bayesian classifiers are the most common approaches (e.g., GLUE [7] and Autoplex [11])
graph theory—by representing schemata in tree or graph form, e.g. the TreeMatch algorithm [6] which estimates the similarity of leaf nodes in an XML DTD by estimating the similarity of their ancestors.

There are also a number of hybrid approaches to schema-matching which combine methods from the above categories.

Gal et al [12] recognised a need to include uncertainty in the matching process, and outlined a fuzzy framework for schema integration. Gal has also looked at the problem of evaluating the matching between schemata, compared to a notional "ideal" matching that would be produced by a human.

Search Software America, now using the name "Identity Systems", markets a name and address matching package which:
"automatically overcomes the vast majority of problems arising from spelling, typing and transcription errors; nicknames, synonyms and abbreviations; foreign and anglicized words; prefix and suffix variations; the concatenation and splitting of words; noise words and punctuation; casing and character set variations" (See http://www.identitysystems.com/)

Although full technical details are not available, this software appears to implement a matching service based on the standard probabilistic record-linkage algorithms outlined above.

Two further papers from the same author (Gal et al [13] and [14]), look at mappings between schemata by combining mappings between an attribute in one schema and a "similar" attribute in a second schema. The mapping is represented as a fuzzy relation—one consequence of this is that the mapping must be symmetric. These papers suggest using a simple weighted average to combine mappings between pairs of attribute into a mapping between schemata. In some cases they consider a wider range of factors in matching attributes, taking account of attribute names as well as attribute values. They are not concerned with mappings between entities—indeed, it does not appear from the experiments (Gal et al [13], section 6) that they have considered mappings between entities, focussing instead on the relation between each approximate mapping (between attribute pairs) and a human-defined "best mapping" (Gal et al [13], section 6.3).

Ying Ding and Schubert Foo [15] is a survey paper, focussing on the ontology mapping problem in the world wide web (regarding an ontology as roughly equivalent to a schema). The methods surveyed rely on manual input (see table 2) and do not address the issue of uncertainty in the mapping between attribute values and in the mapping between objects. Much of the focus is on the problem of ontology maintenance and evolution.

Prior art patent documents include the following:

US2005060332 (Bernstein et al), which describes a method for schema matching (rather than object matching). It uses mappings between attributes but then combines these into an overall measure for a mapping between schemata using an arbitrary formula.

US2004158567 (Dettinger et al), which describes a system for assisting the manual development of mappings between schemata, by examining constraints associated with an attribute from one schema and only proposing candidate attributes (from the second schema) whose values obey those constraints. The mappings between attributes are crisp, and do not take account of uncertainty; and US2005055369 (Gorelik et al), which relates to a schema matching problem in relational databases and produces a mapping between objects represented in different databases and a "universal" set of objects (UDO). The mappings between attributes are crisp, i.e. do not involve any uncertainty, and a mapping is chosen if the proportion of entities it links is greater than some threshold. Accepted mappings between attributes are combined to give a mapping between objects using join operations on the database, i.e. by using crisp equality with no scope for any partial matching.

A problem remains of how best to create a mapping between two (or more) data sources which represent (approximately) the same sets of objects (or their sets of objects overlap, at least partially) but which use different schemata i.e. the two sources have different sets of attributes.

In general, where prior art approaches are based on record matching, they assume at least some knowledge of the schema, i.e. it is necessary to specify at least some attributes which correspond to those in another database.

SUMMARY OF THE INVENTION

According to the present invention, there is provided a method of operating a database management system for integrating data from a plurality of data sources, said data sources being at least partially structured and comprising data objects each comprising data relating to one or more attributes of an entity; said method comprising steps of:

(a) selecting, for each of a first and a second data source, an initial attribute or combination of attributes;

(b) automatically selecting, in respect of said attributes or combinations of attributes of said first and second data sources, a candidate matching function from a set of possible matching functions, said matching functions relating to possible mappings between data relating to one or more attributes in said first data source and data relating to one or more attributes in said second data source;

(c) applying said candidate matching function to data relating to said selected attribute or combination of attributes in said first data source to create possible data relating to said selected attribute or combination of attributes in said second data source;

(d) deriving, from said possible data and from actual data in said second data source a disparity measure relating to an amount of disparity therebetween;

(e) automatically selecting one or more different candidate matching functions from said set of possible matching functions, and repeating steps (c) and (d) in respect thereof;

(f) establishing, from said candidate matching functions, a candidate matching function having a disparity measure indicative of the lowest amount of disparity, and designating said candidate matching function as a probable candidate matching function;

(g) selecting, for each of said first and second data sources, one or more further attributes or combinations of attributes, and performing steps (b) to (f) in respect thereof whereby to establish probable candidate matching functions in respect thereof; and (h) determining, with reference to one or more of said established probable candidate matching functions, a probable correspondence between data objects of said first data source and data objects of said second data source.

Also according to the present invention, there is provided a database management system for integrating data from a plurality of data sources, said data sources being at least partially structured and comprising data objects each comprising data relating to one or more attributes of an entity; said system comprising:

(a) means for selecting, for each of a first and a second data source, an initial attribute or combination of attributes;

(b) means for automatically selecting, in respect of selected attributes or combinations of attributes of said first and second data sources, a candidate matching function from a set of possible matching functions, said matching functions relating to possible mappings between data relating to one or more attributes in said first data source and data relating to one or more attributes in said second data source;

(c) means for applying a selected candidate matching function to data relating to said selected attribute or combination of attributes in said first data source to create possible data relating to said selected attribute or combination of attributes in said second data source;

(d) means for deriving, from said possible data and from actual data in said second data source a disparity measure relating to an amount of disparity therebetween;
(e) means for automatically selecting one or more different candidate matching functions from said set of possible matching functions, and arranging for the or each of said different candidate matching functions to be treated by means (c) and (d);
(f) means for establishing, from said candidate matching functions, a candidate matching function having a disparity measure indicative of the lowest amount of disparity, and designating said candidate matching function as a probable candidate matching function;
(g) means for selecting, for each of said first and second data sources, one or more further attributes or combinations of attributes, and arranging for the or each of said further attributes or combinations of attributes to be treated by means (b) to (f) whereby to establish probable candidate matching functions in respect thereof; and
(h) means for determining, with reference to one or more of said established probable candidate matching functions, a probable correspondence between data objects of said first data source and data objects of said second data source.

Embodiments of the invention to be described below use an approach based on record matching, which does not rely on or necessarily assume any knowledge of the schema, i.e. it is not necessary for a user to specify which attributes match. A library of matching functions may instead be used to find possible correspondences between attributes from different data sources. These matching functions can be pre-programmed, or may be created by a machine learning system. Possible matching attributes (with associated matching functions) are ranked by a measure of fuzzy specificity and the probability of matches between the attributes.

According to preferred embodiments of the invention, each of the steps of the above method may be carried out automatically, such that the method may be said to be fully computer-implemented. It is foreseeable, however, that certain other embodiments of the invention may allow for one or more steps, such as the step of selecting the initial attribute for one or both of the data sources, to be carried out "manually" (i.e. by a human user, for example). Such embodiments could be said to be partially computer-implemented.

Preferred embodiments of the invention use a soft computing method, combining fuzzy and Bayesian techniques, to represent and update the correspondences between two data sources. Updating may be an iterative process, using the ranked list of attributes pairs and matching functions. The process may be stopped by monitoring the fuzzy entropy of the mapping from one data source to the second.

An important feature of preferred embodiments of the invention is the way they may combine "partial matches" between attributes from different sources in order to generate an estimate of the match between objects in those sources. For each object in the first source, a fuzzy set of possible matches may be found in the second source. This may be achieved using an algorithm which first considers possible matchings between attribute values and establishes a ranking order for these mappings. The mappings are likely or expected to be uncertain so that an attribute value may map to a fuzzy set of possible attribute values. This is not necessarily symmetric. The best mappings are selected for the next stage. In the second stage, for each attribute mapping selected, the matching for an object may be updated on the basis of the fuzzy probability of the new attribute mapping for that object, given what has already been established.

Using embodiments of the invention two structured or semi-structured data sources may be integrated. The data may be stored in databases or non-database sources (XML, web, semi-structured repositories, etc) or even as free text in a document base. It is frequently necessary to make use of more than one source in carrying out a task (e.g. answering a query, compiling a report, carrying out an electronic transaction, comparing products from different sources, etc).

The classification structure and attributes (properties) of the objects (i.e. the values associated with meta-data tags) can be used to guide the integration of information. Even if different hierarchies use different categories, there is likely to be a degree of correspondence, and objects placed within similar categories are likely to have similar properties. For example, the automotive industry and chemical industry have separately agreed standards for electronic data exchange (www.starstandard.org, www.cidx.org) which are almost identical in some categories, overlap in some and are disjoint in others. However it is perfectly possible that a third party might wish to merge information formatted according to the two different standards. Similarly, a digital library and an online bookseller refer to the same (structured) objects but may differ in categorisation and details stored about each book.

In the absence of a centrally agreed standard, it is rare for two sources to adhere to precisely the same conventions. Even where agreed conventions exist, interpretations may differ—for example, consider an electronic order for goods with a tag "shippingDate". It may pot be clear whether "shippingDate" refers to the time when goods are delivered to the customer or the time when they leave the supplier. Additional problems may arise from subtle differences in the information stored—for example, a classified directory may list phone numbers as <area-code><local-number> whereas another might just list the <local-number>. A person may be listed as <surname>, <initials> or as <forename><surname>. Thus even when the information from different sources is identical, a straightforward syntactic match might not reveal this.

In describing a preferred embodiment of the invention below, we will consider two information sources referring to discrete sets of objects, with associated properties (attributes). The properties can be used to group the objects into classes, which may in turn form some sort of hierarchical structure. For example, documents in a digital library or online bookshop may have some or all of the properties such as author, publication date, title, publication format, ISBN, publisher, etc. Restaurants in a classified directory might have a name, address, telephone number, as well as an optional brief description and other properties such as location, menu details, etc. Entries in product catalogues might have names, part numbers, prices, categories and short descriptions. These are all examples of structured objects that refer to real-world entities.

Given two sources which are known (or assumed) to refer to approximately the same sets of real world entities, the information fusion task may be thought of as how to determine whether an object from a first source or database, which we will term db1, refers to the same real-world entity as an object from a second source or database db2, and to determine how the properties correspond (e.g. author and composer may correspond almost exactly to creator; business-name should correspond to company-name, etc).

Preferred embodiments of the invention use a fuzzy updating technique to find an approximate mapping between two sets of objects, given possible mappings between some of their properties. An iterative process may be used, in which the possible mappings between properties are chosen according to the strength of the correspondence between the properties. A new measure of fuzzy entropy may be used to halt the process.

In order to outline an embodiment of the invention below, we will consider a situation in which there are:
- two structured or semi-structured information sources db1 and db2, which are sets of objects referring to approximately the same sets of items in the real world. The objects have attributes (properties).
- candidate procedures for identifying similarity or identity between attribute values.

For each object in db1, an estimate of the corresponding object in db2 is produced. Preferably, this estimate is a fuzzy subset of objects in db2. This fuzzy set can be converted to a probability distribution if required.

The approach is based on the "Identity of Indiscernibles", proposed by Leibniz, which can be summarised as follows: If we cannot tell ("discern") two objects from each other, then they are the same object. Here, we can only tell two objects apart on the basis of their attribute values. Let us assume that sources db1 and db2 have the same sets of attributes. Then, if an object from db1 has identical attribute values to an object from db2, we must conclude that they refer to the same real-world entity. If the attributes differ but the sets of possible attribute values can be related in some way, then we can find an approximation to the true mapping from db1 to db2.

For example in tables 1 and 2 below, each row corresponds to an object which is uniquely identified by the first attribute ("Employee-ID" in source db1 shown in Table 1, "Name" in source db2 shown in Table 2). We use a tabular representation for clarity, but we could equally well use XML, RDF or some other representation of semi-structured data.

TABLE 1

Data Source "db1"

| Employee-ID | D-O-B | Job title |
|---|---|---|
| 1407 | 16 Jul. 1971 | Software Engineer |
| 1213 | 24 Feb. 1960 | Software Engineer |
| 8100 | 5 May 1973 | Consultant |
| etc | etc | etc |

TABLE 2

Data Source "db2"

| Name | Date of Birth | Occupation |
|---|---|---|
| Bill | 24 Feb. 1960 | Programmer |
| Bob | 11 Nov. 1951 | Sales Rep |
| Ben | 24 Feb. 1960 | Manager |
| etc | etc | etc |

In order to establish a correspondence between these two sources db1 and db2, it will first be noticed that "D-O-B" in db1 maps in an obvious way to "Date of Birth" in db2 with a simple translation of the format. Some entries under "Job title" in db1 correspond roughly to those under "Occupation" in db2—for example, "Software Engineer" is approximately equivalent to "Programmer".

These mappings can be found by examining the entire sets of values for an attribute in db1 and an attribute in db2, and looking for exact or approximate functions from the db1 attribute values to the db2 attribute values either by using pre-programmed procedures or by learning. More accurate mappings are preferred when determining the possible equivalences between objects, and a novel method of determining the accuracy of a mapping is given below.

Initially we make the assumption that each object in db1 corresponds to a fuzzy set containing all objects in db2—for example the object with employee-ID=1213 corresponds to {Bill/1, Bob/1, Ben/1, . . . } where the notation e/m represents an element e with membership m. The set above represents a state of maximum uncertainty; this can be quantified by a fuzzy entropy-like measure.

Taking into account the fact that "D-O-B" in db1 corresponds to "Date of Birth" in db2 changes the set corresponding to employee-ID=1213 to {Bill/1, Ben/1} (assuming no other objects match on the D-O-B attribute). Clearly this set is less uncertain than before. Adding the information that Software Engineer is approximately equivalent to Programmer changes the set to {Bill/x} where x is related to the degree of equivalence between Software Engineer and Programmer. A similar approach derives an approximate correspondence for each element in db1. If there is evidence that an object in db1 does not correspond to anything in db2, the set would be empty; if there is no evidence then the set would remain as the whole of db2.

Preferred embodiments of the invention use possible pairs of attributes in order of accuracy until the overall uncertainty is minimised. Such embodiments may be made robust against missing information, noisy or erroneous data, and incomplete overlap between the sets of real-world entities referred to by db1 and db2.

DESCRIPTION OF THE EMBODIMENTS

Figure 1:
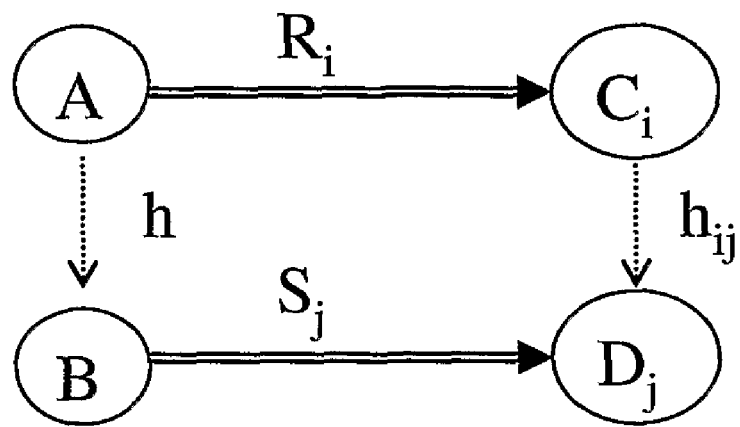
FIG. 1 represents the relationships between two sets of objects and their respective attributes.

With reference to FIG. 1, assume we have two sets of objects $A=\{a_1 \ldots a_n\}$; and $B=\{b_1 \ldots b_m\}$, from data sources db1 and db2 respectively, and that we wish to establish an approximate mapping h from A to B. The data sources db1 and db2 may be in separate databases, but it will be noted that they may be from the same database. In order to establish a correspondence between the elements of A and B, we examine the properties (attributes) of the elements.

Let the objects in A and B have attributes $C_1, C_2, \ldots D_1, D_2, \ldots$ with relations defined as:

$R_i:A \to C_i$ i=1 . . . nA $S_j:B \to D_j$ j=1 . . . nB

Note that these are relations, i.e. they can be single- or multi-valued. Examples would be height, weight, nationality, name, passport number, phone number(s) etc. We do not assume that the information about A and B in relations $R_i, S_j$ is identical or completely consistent, but we do assume that some of these relations reflect similar or identical properties of the objects in A and B. Thus for some choices of pairs of co-domains $(C_i, D_j)$ we assume an exact or approximate matching function $h_{ij}$ which for each element of C returns a (possibly fuzzy) subset of D. This can be converted to a mass assignment giving a numerical estimate of the probability that the element corresponding to some $c \in C_i$ lies in a subset $(d_1 \ldots d_k) \subseteq D_j$. (We will refer to $h_{ij}$ as a function even though its output is not a single value.)

The $h_{ij}$ can be obvious mappings from co-domain to co-domain, involving exact matches or small permutations, truncations, etc; alternatively they can be more sophisticated functions, possibly the output of a machine learning process. The proportion of a domain that matches gives an indication of the overlap between domains and hence the possibility that two attributes correspond.

How do we Derive h?

This is obvious if the functions $h_{ij}$ are exactly known—for each element $a_k$ in A, $$h(a_k) = S_j^{-1}(h_{ij}(R_i(a_k)))$$

Example 1

To illustrate, we will consider a first example using a set of authors identified by author-id (A) and the one-to-many relations:

| $R_1$ (author-id → name) | |
| --- | --- |
| author-id | name |
| author-1 | C. L. Dodgson |
| author-1 | Lewis Carroll |
| author-2 | H. G. Wells |
| author-3 | I. M. Copi |
| author-4 | Michael Coren |

| $R_2$ (author-id → book title) | |
| --- | --- |
| author-id | book title |
| author-1 | Symbolic Logic |
| author-1 | Alice in Wonderland |
| author-2 | The Invisible Man |
| author-3 | Symbolic Logic |
| author-4 | The Invisible Man |

| $R_3$ (author-id → date-of-birth) | |
| --- | --- |
| author-id | date-of-birth |
| author-1 | 27 Jan. 1832 |
| author-2 | 21 Sep. 1866 |
| author-5 | 30 Dec. 1865 | and (from another source) a set of writers identified by real name (B) with one-to-many relations:

| $S_1$ (writer-real-name → ISBN) | |
| --- | --- |
| writer (real name) | ISBN |
| C. L. Dodgson | 0486204928 |
| C. L. Dodgson | 0091737648 |
| C. L. Dodgson | 0573150060 |
| H. G. Wells | 0809596369 |
| H. G. Wells | 0785731547 |
| I. M. Copi | 0023249803 |
| M. Coren | 0747511586 |

| $S_2$ (writer-real-name → pseudonym) | |
| --- | --- |
| writer (real name) | pseudonym |
| C. L. Dodgson | Lewis Carroll |
| H. G. Wells | Walker Glockenhammer |
| H. G. Wells | Septimus Browne |

| $S_3$ (writer-real-name → year-of-birth) | |
| --- | --- |
| writer (real name) | year-of-birth |
| C. L. Dodgson | 1832 |
| H. G. Wells | 1866 |
| A C Doyle | 1859 |
| J R Kipling | 1865 |

We assume there is a function $h_{21}$ which will return the set of ISBNs corresponding to a particular title:

| $h_{21}$ | |
| --- | --- |
| BOOK TITLE | ISBN |
| Alice in Wonderland | 0091737648 |
| | 0573150060 |
| The Invisible Man | 0809596369 |
| | 0785731547 |
| | 0747511586 |
| Symbolic Logic | 0486204928 |
| | 0023249803 | and the obvious function $h_{33}$ which matches date-of-birth with year-of-birth.

In order to link author-2 from set A to an author name from set B, we could look for the set of book titles written by that author using $R_1$, find the corresponding ISBNs using $h_{21}$ and then work backwards to writer(real name) via $S_1$. Thus:

$$R_1(author_2) = \{\text{The Invisible Man}\}$$

$$h_{21}(R_1(author_2)) = \{0809596369, 0785731547, 0747511586\}$$

$$S_2^{-1}(h_{21}(R_1(author_2))) = \{\text{H. G. Wells}, \text{M. Coren}\}$$

Given complete and certain information, we can choose additional pairs of attributes to refine this mapping. Taking the obvious mapping $h_{33}$ from date-of-birth to year-of-birth would give a second piece of evidence:

$$S_3^{-1}(h_{33}(R_3(\text{author}_2)))=\{\text{H. G. Wells}\}$$

so that we could conclude that author-2 in set A corresponds to H. G. Wells in set B. In general, we have to allow for the fact that $h_{ij}$ are approximate, and may be inconsistent. For example, year of birth might be missing, inaccurate or not known for sure ("born in the mid 1860's"). Taking the crisp information in the example above and allowing flexibility in the match function $h_{33}$ could give:

$$S_3^{-1}(h_{33}(R_3(\text{author}_5)))=\{\text{H. G. Wells}/\mu_1, \text{J. R. Kipling}/\mu_2, \text{A. C. Doyle}/\mu_3\}$$

where the memberships $\mu_i$ reflect the degree of match between 30 Dec. 1865 and 1866, 1865, 1859 respectively.

We treat each selected $h_{ij}$ as an approximate piece of evidence or observation of the elements in B that possibly correspond to elements in A. Because the evidence is not certain, we cannot completely rule out (or rule in) any elements—all we can do is update the probability that an element in A corresponds to a given subset of elements in B.

To start with, the most general statement we can make for any element $a_k$ is that it corresponds to some element in B. i.e. (for all k)

$$h(a_k) \in B:1$$

where: 1 indicates that $h(a_k) \in B$ has a probability of 1, or if we represent it as a mass assignment:

$$h_0(a_k)=B:1$$

(note that incompleteness i.e. assignment of mass to the empty set means that $a_k$ corresponds to an element outside B). This is our initial (and uninformative) approximation to h.

Figure 2:
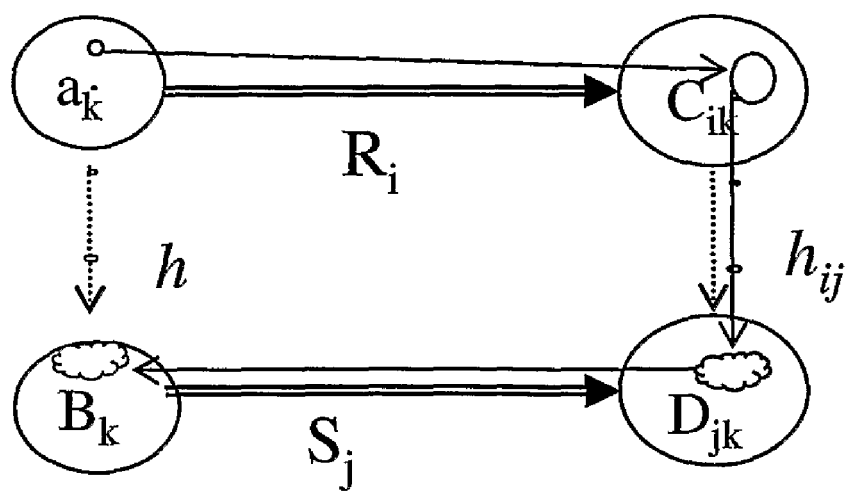
FIG. 2 represents relationships between elements and subsets of two co-domains.

With reference to FIG. 2, if we can establish a reasonably specific matching $h_{ij}$ between two co-domains $C_i$ and $D_j$, we can use this to refine the current approximation to h, since if $$R_i(a_k)=C_{ik}$$

and $h_{ij}(C_{ik})=D_{jk}$ and $S_j(B_k)=D_{jk}$ then $h(a_k)=B_k$ i.e. $a_k$ corresponds to an element x in the subset $B_k$ with some probability given by:

$$m_{ij}^k(x)=Pr(x \in S_j^{-1}(h_{ij}(R_i(a_k))))$$

Thus, given a possible match function $h_{ij}$ we update the probability that $$h(a_k) \in B_k$$

for each $B_k$, based on the "observed" values $h_i(a_k)$.

How should we combine the masses $m_{ij}$ from different i, j pairs? Consider a number of observations which are represented as mass assignments over some universe of possible values B.

Let $M_n$ be the mass assignment on B that makes the observed values most likely after n observations, i.e. choose the masses to maximise:

$$Pr(M_n|o_1, o_2, \ldots, o_n)$$

This gives a way of updating M after each observation.

Using a naïve Bayes assumption:

$$Pr(M_n | o_1, o_2, \ldots, o_n) = \frac{Pr(o_1, o_2, \ldots, o_n | M_n) \times Pr(M_n)}{Pr(o_1, o_2, \ldots, o_n)}$$

$$Pr(o_1, o_2, \ldots, o_n | M_n) = Pr(o_1 | M_n) \times Pr(o_2 | M_n) \times \ldots \times Pr(o_n | M_n)$$

Assuming each possible mass assignment $M_n$ is equally likely, $$M_n(B_k) = \frac{N_n(B_k)}{\sum_{X \subseteq B} N_n(X)}$$

where $N_n(X)$ is number of times the subset X has been observed.

Each matching function may give a fuzzy set as its estimation of corresponding elements—for each element $a_k$ in A, and for each chosen $h_{ij}$ the fuzzy set is given by $$S_j^{-1}(h_{ij}(R_i(a_k)))$$

To combine these estimations—in practice, we take the overall average of memberships in the fuzzy sets. The theoretical basis for this is from mass assignment theory and Bayes theorem.

Example 2

To further illustrate the above, we will consider a second more complex example. Consider a set of authors identified by author-id (A) and the relations:

| $R_1$ (author-id → name) | |
|---|---|
| author-id | name |
| author-1 | C. L. Dodgson |
| author-1 | Lewis Carroll |
| author-2 | H. G. Wells |
| author-3 | I. M. Copi |
| author-4 | Michael Coren |
| author-5 | Rudyard Kipling |
| author-6 | Sir Arthur Conan Doyle |
| author-7 | Stephen King |
| author-8 | Sir Walter Scott |
| author-9 | Beatrix Potter |

| $R_2$ (author-id → book title) | |
|---|---|
| author-id | book title |
| author-1 | Symbolic Logic |
| author-1 | Alice in Wonderland |
| author-2 | The Invisible Man |
| author-3 | Symbolic Logic |
| author-4 | The Invisible Man |
| author-4 | The Life of Sir Arthur Conan Doyle |
| author-5 | Actions and Reactions |
| author-6 | Historia de la penumbra y lo invisible |
| author-6 | J. Habakuk Jephson's Statement |
| author-7 | The Talisman |
| author-8 | The Talisman |
| author-9 | The Taylor of Gloucester |

| $R_3$ (author-id → date-of-birth) | |
| --- | --- |
| author-id | date-of-birth |
| author-1 | 27 Jan. 1832 |
| author-2 | 21 Sep. 1866 |
| author-5 | 30 Dec. 1865 |
| author-6 | 22 May 1859 |
| author-7 | 21 Sep. 1947 |
| author-8 | ??? 1771 |
| author-9 | 28 Jul. 1866 |

| $R_4$ (author-id → nationality) | |
| --- | --- |
| author-id | nationality |
| author-1 | UK |
| author-1 | UK |
| author-2 | UK |
| author-4 | UK |
| author-5 | UK | and (from another source) a set of writers identified by real name (B) with one-to-many relations:

| $S_1$ (writer-real-name → ISBN) | |
| --- | --- |
| writer (real name) | ISBN |
| C. L. Dodgson | 0486204928 |
| C. L. Dodgson | 0091737648 |
| C. L. Dodgson | 0573150060 |
| H. G. Wells | 0809596369 |
| H. G. Wells | 0785731547 |
| I. M. Copi | 0023249803 |
| M. Coren | 0747511586 |
| A. I. Conan Doyle | 9561314592 |
| Stephen King | 0345444884 |
| Sir Walter Scott | 1592247709 |

| $S_2$ (writer-real-name → pseudonym) | |
| --- | --- |
| writer (real name) | pseudonym |
| C. L. Dodgson | Lewis Carroll |
| H. G. Wells | Walker Glockenhammer |
| H. G. Wells | Septimus Browne |
| A I Conan Doyle | anonymous |

| $S_3$ (writer-real-name → year-of-birth) | |
| --- | --- |
| writer (real name) | year-of-birth |
| C. L. Dodgson | 1832 |
| H. G. Wells | 1866 |
| A C Doyle | 1859 |
| J R Kipling | 1865 |
| M. Coren | 1959 |
| Sir Walter Scott | 1832 (deliberate noise - this is date of death. Correct value 1771) |

-continued

| $S_3$ (writer-real-name → year-of-birth) | |
| --- | --- |
| writer (real name) | year-of-birth |
| Stephen King | 1947 |
| Beatrix Potter | 1866 |

| $S_4$ (writer-real-name → place-of-birth) | |
| --- | --- |
| writer (real name) | place-of-birth |
| C. L. Dodgson | Daresbury |
| H. G. Wells | Bromley |
| A I Conan Doyle | Edinburgh |
| J R Kipling | Bombay |
| M. Coren | Essex |
| Sir Walter Scott | Edinburgh |
| Stephen King | Maine |

Again we assume there is a function $h_{21}$ which will return the set of ISBNs corresponding to a particular title:

| $h_{21}$ | |
| --- | --- |
| BOOK TITLE | ISBN |
| Alice in Wonderland | 0091737648 |
| | 0573150060 |
| The Invisible Man | 0809596369 |
| | 0785731547 |
| | 0747511586 |
| | 0394222520 |
| Historia de la penumbra y lo invisible | 9561314592 |
| Symbolic Logic | 0486204928 |
| | 0023249803 |
| The Tailor of Gloucester | 0723205949 |
| The Talisman | 0345444884 |
| | 1592247709 |

Note that there will be some uncertainty here because titles may not match properly (e.g. tailor/taylor of gloucester, "invisible man"/"Historia de la penumbra y lo invisible"). Thus books matching "invisible man" could be

{0809596369/1, 0785731547/1, 0747511586/1, 0394222520/1, 9561314592/0.2}

There is an obvious match between dates:

| $h_{33}$ (for example) | | |
| --- | --- | --- |
| date-of-birth | year-of-birth | μ |
| 21 Sep. 1866 | 1865 | 1 |
| | 1866 | 0.9 |
| | 1859 | 0.2 | and similarly for other dates.

Finally there is a link between place of birth and nationality:

| nationality | place-of-birth | μ |
|---|---|---|
| UK | Bromley | 1 |
| UK | Edinburgh | 1 |
| Indian | Bombay | 1 |
| UK | Bombay | 0.1 |
| US | Maine | 1 |
| etc. | | |

In mass assignment terms, initially:

author-1={C. L. Dodgson, H. G. Wells, A C Doyle, J R Kipling, ... }:1 author-2={C. L. Dodgson, H. G. Wells, A C Doyle, J R Kipling, ... }:1

Evidence from using $h_{21}$ author-1={C. L. Dodgson,I. M. Copi}:1 author-2=({H. G. Wells,M Coren}:0.8,

{H. G. Wells,M Coren,A C Doyle}:0.2)

(or as fuzzy sets {C. L. Dodgson/1,I. M. Copi/1}

{H. G. Wells/1,M Coren/1,AC Doyle/0.2})

Combined author-1={C. L. Dodgson,H. G. Wells,A C Doyle,J R Kipling, ... }:0.5

{C. L. Dodgson,I. M. Copi}:0.5} author-2={{C. L. Dodgson,H. G. Wells,A C Doyle,J R Kipling, ... }:0.5

{H. G. Wells,M Coren,AC Doyle}:0.1,

{H. G. Wells,M Coren}: 0.4}

(equivalently)

fuzzy set-1={C. L. Dodgson/1,I. M. Copi/1,H. G. Wells/0.5,A C Doyle/0.5, ... } fuzzy set-2={H. G. Wells/1,M Coren/1,A C Doyle/0.6,J R Kipling/0.5, ... }

In this case the fuzzy set and mass assignment are equivalent and are shown for illustration; below, we simply use fuzzy sets:

Using $h_{33}$, fuzzy sets are:

author-1={C. L. Dodgson/1,Sir Walter Scott/1} author-2={H. G. Wells/1,Beatrice Potter/1 J R Kipling/0.9,A C Doyle/0.2}

Combining:

author-1={C. L. Dodgson/1,I. M. Copi/0.66, Sir Walter Scott/0.66,A C Doyle/0.33,H. G. Wells/0.33, ... }:0.33 author-2={H. G. Wells/1,M Coren/0.66,Beatrice Potter/0.66, J R Kipling/0.6033,A C Doyle/0.466 ... }

Note that these memberships are the average of all fuzzy estimations, i.e. the initial estimate, $h_{21}$ and $h_{33}$.

Using $h_{44}$ author-1={C. L. Dodgson/1H. G. Wells/1,A I Conan Doyle/1,J R Kipling/0.1,Sir Walter Scott/1, ... } and similarly for author-2. Because this is very general, the entropy increases so it is rejected and we retain the estimates derived from $h_{21}$ and $h_{33}$.

Taking the highest membership as the best approximation we have:

author-1=C. L. Dodgson author-2=H. G. Wells as expected, and similarly for author-3, ... etc.

Choice of pairs Ri, Sj

Clearly it is not very useful to update with attribute domains ($R_i$, $S_j$) that hardly match each other. The possible pairs of attributes could be ordered according to the average maximum probability of matching, AvMaxMatch. This is defined as follows:

$$AvMaxMatch(h_{ij}) = \frac{\sum_{x \in C_i} \max_{y \in D_j}(Pr(y \in h_{ij}(x)))}{|C_i|}$$

However this is not necessarily helpful in choosing which attribute to use next if there is a large amount of uncertainty in the approximate mapping. For example, if $C_i=\{c_1,c_2\}$ $D_j=\{d_1,d_2,d_3\}$ then the universal matching function $h1_{ij}(c_1)=\{d_1,d_2,d_3\}$ $h1_{ij}(c_2)=\{d_1,d_2,d_3\}$ has an AvMaxMatch of 1 (since it definitely links every element of $C_i$ to something in $D_j$), whereas $h2_{ij}(c_1)=\{d_1/0.9\}$ $h2_{ij}(c_2)=\{d_2/1,d_3/0.4\}$ would only have an AvMaxMatch of 0.95 although it is much more specific than $h1_{ij}$. Thus when ordering attributes, we may alternatively take the average of the maximum probability from the least prejudiced distribution, AvMatch, which is defined as follows:

$$AvMatch(h_{ij}) = \frac{\sum_{x \in C_i} \max_{y \in D_j}(Pr(y \in LPD(h_{ij}(x))))}{|C_i|}$$

For the cases above:

AvMatch($h1_{ij}$)=⅓

AvMatch($h2_{ij}$)=0.85

This discriminates against matching functions $h_{ij}$ that are very unspecific. It makes sense to choose key attributes $C_{key}$ and $D_{key}$ that are close to being "key" domains i.e. uniquely identifying an object. This can be estimated quite easily by looking for domains with cardinality equal to or close to the number of entries in the database. Key attributes can be identified by the database schema or by user guidance. In the absence of any information, selection of key attributes can be done by finding an attribute (or combination of attributes) which has a unique value for each row in the database, i.e. find all values and check that each occurs only once, or failing that, by finding an attribute which is near to satisfying this requirement relative to other attributes. This approximation allows the system for a level of noise to be taken account of.

Efficiency Considerations

The discussion above works with mass assignments over the universe B rather than a distribution on B since this avoids having to make assumptions about how to divide the mass on non-singleton sets. However, there is clearly an implementation problem since the power set of B has $2^{|B|}$ elements which is not feasible for large universes. We can constrain the size of our work space by requiring $M_i$ to correspond to a fuzzy set, i.e. to be a nested mass assignment. This simplifies both the representation and the processing involved. It turns out that we just need to consider the mean membership of each element; this is equivalent to taking an average mass assignment and then restricting it (by means of type-2 restrictions) until it is nested and hence corresponds to a fuzzy set.

When to Stop

We measure the effectiveness of each attribute pairing $(R_i \sim S_j)$ by monitoring the total entropy of h. We have, for each element $a_k$, a corresponding fuzzy set $B_k$ which is the current best estimate of the elements in B which match $a_k$.

We calculate the entropy of a nested mass assignment (fuzzy set) by creating the corresponding least prejudiced distribution $(b_i:p_i)$ and finding $$-\sum_i p_i \log_2(p_i)$$

This can be done quickly by putting the N elements in increasing order i=0 ... N–1

$$p_i = p_{i-1} + \frac{\mu_i - \mu_{i-1}}{N - i}$$

for i=1 ... N–1, with $p_0 = \mu_0/N$

In the case of an incomplete mass assignment, it is assumed the mass is spread equally amongst all elements in the domain—this increases the entropy considerably.

This value is calculated for all fuzzy sets $B_k$, and the total represents the entropy of the current h. If this increases, then the last attribute pairing $(R_i \sim S_j)$ has made the approximate h less specific and so is rejected. It is assumed that lower ranked attribute pairs will also make the approximate h less specific and so the process stops.

Algorithm (Outline)

Figure 3:
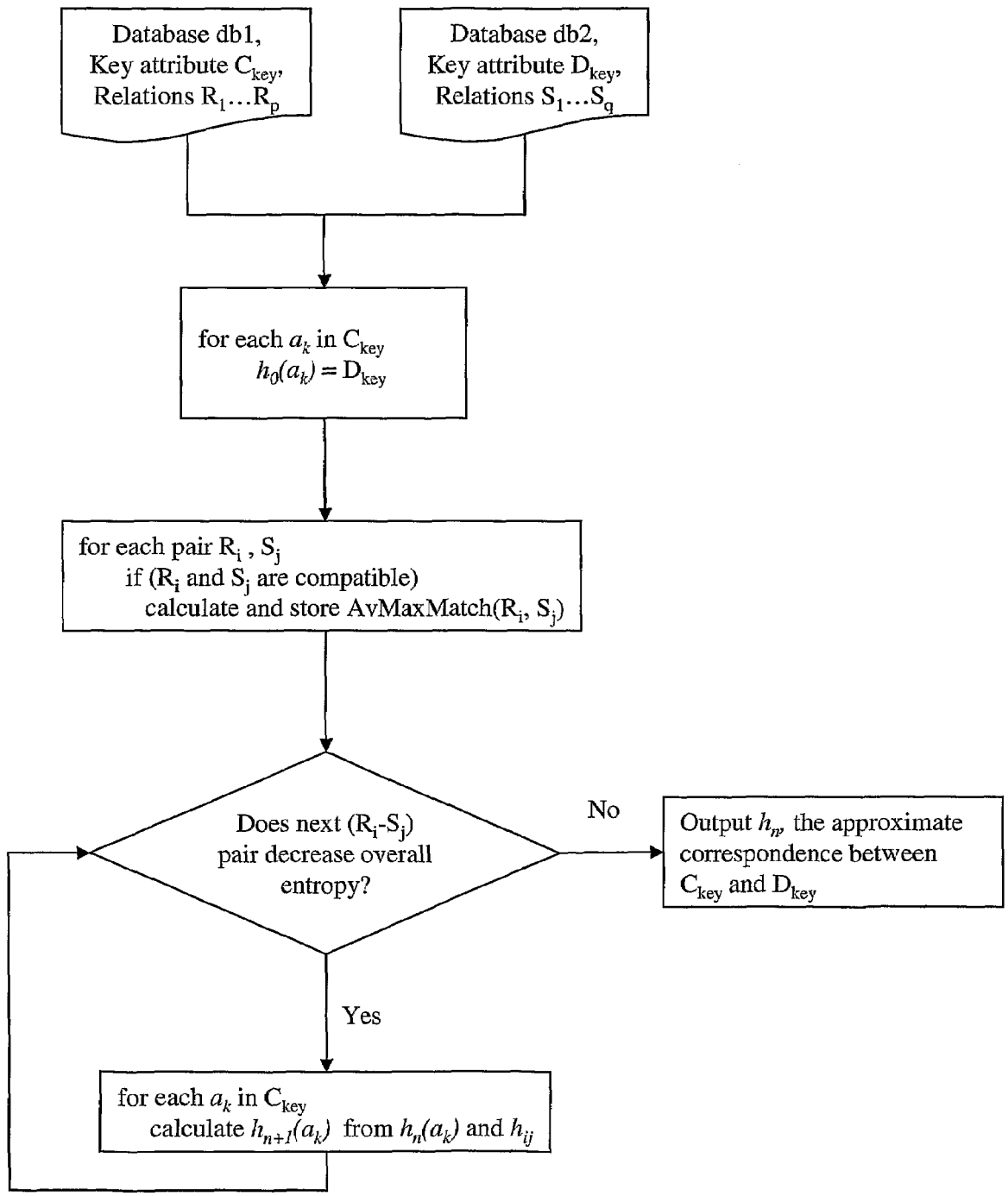
FIG. 3 shows the steps which may be carried out in implementing an embodiment of the present invention.

With reference to FIG. 3 and Appendix 1, the steps which may be carried out in implementing the above are briefly discussed below.

```
Inputs
    two chosen domains A, B
    sets of relations R_i, S_j and associated ranges C_i, D_j
    set of approximate matching functions h_ij which associate each element in C_i with a
fuzzy set of elements in D_j
Output – a partial fuzzy mapping between A and B
Optional : verify that C_key and D_key are key domains i.e. have few repeated elements
for each a_k in C_key
        initialise B_k = D_key i.e. for all b, μ_k (b)=1
end for
foreach pair R_i – S_j
        if background knowledge doesn't rule out this pair (e.g. from schema matching)
            find AvMatch (R_i, S_j)
            store in table if non-zero
end for
Sort table by decreasing AvMatch score (i.e. probability of correspondence)
n:=0
while next (R_i–S_j) in table decreases the overall entropy of h
        for each a_k in A
```

$$\mu_k(b) := \frac{\mu_k(b) \times n + \mu_{ij}(b)}{n + 1}$$

```
        end for
        n := n+1
endwhile
output h : a_k → μ_k(b) for all k and b
```

Results obtained following implementation of an algorithm such as that outlined above are given in Appendix 2.

REFERENCES

1. Newcombe, H B et al: "Automatic Linkage of Vital Records", Science, 1959, 130, p 954-9
2. Fellegi, IP and Sunter, A B: "A Theory for Record Linkage", J. American Statistical Assoc, 1969, 64, p 1183-1210.
3. Elfeky, M G, Verykios, V S & Elmagarmid, A K: "TAILOR: A Record Linkage Tool Box", International Conf. on Data Engineering, 2002, San Jose, Calif.: IEEE Computer Society.
4. Dey, D, Sarkar, S & De, P: "A Distance-Based Approach to Entity Reconciliation in Heterogeneous Databases", IEEE Transactions on Knowledge and Data Engineering, 2002, 14(3), p 567-582.
5. Bilenko, M et al: "Adaptive Name Matching in Information Integration", IEEE Intelligent Systems, 2003, 18, p 16-23.

6. Madhavan, J, Bernstein P A, & Rahm, E: "Generic Schema Matching with Cupid", Proceedings of the International Conference on Very Large Data Bases, 2001, p 49-58.
7. Doan, A., Domingos, P & Halevy, A: "Learning to Match the Schemas of Data Sources—A Multistrategy Approach", Machine Learning, 2003, 50(3), p 279-301.
8. Modica, G, Gal, A & Jamil, H M: "The Use of Machine-Generated Ontologies in Dynamic Information Seeking", Lecture Notes in Computer Science, 2001(2172), p 433-448.
9. Noy, N F & Musen, M A: "The PROMPT suite: interactive tools for ontology merging and mapping", International Journal of Human Computer Studies, 2003, 59(6), p 983-1024.
10. Rahm, E. & Bernstein, P A: "A Survey of Approaches to Automatic Schema Matching", VLDB Journal, 2001, 10(4), p 334-350.
11. Berlin, J. & Motro, A: "Autoplex: Automated Discovery of Content for Virtual Databases", Lecture Notes in Computer Science, 2001 (2172), p 108-122.
12. Gal, A et al. "A Model for Schema Integration in Heterogeneous Databases", Seventh International Database Engineering and Applications Symposium (IDEAS'03), 2003, Hong Kong, IEEE Press.
13. Gal, Anaby-Tavor, Trombetta & Montesi: "A Framework for Modeling and Evaluating Automatic Semantic Reconciliation", VLDB Journal (2005), vol. 14(1), pages 50-67.
14. Gal, Modica & Jamil, Eyal: "Automatic Ontology Matching using Application Semantics", published on the Internet. See: http://iew3.technion.ac.il/OntoBuilder/Data/10.OntoBuilder_Papers/dis.pdf
15. Ying Ding & Schubert Foo: "Ontology Research and Development: Part 2—A Review of Ontology mapping and evolving", Journal of Information Science 28(5), (2002), pages 375-388

APPENDIX 1

Possible code steps that could be used to implement the algorithm of FIG. 3:

```
input :
        database db1, "key" attribute C_key, relations R_1...R_p
        database db2, "key" attribute D_key, relations S_1...S_q
initialisation
        for each a_k in C_key
            h_0(a_k) = D_key
        endfor
        for each pair R_i , S_j
            if (R_i and S_j are compatible)
                calculate and store AvMaxMatch(R_i, S_j)
            endif
        endfor
    merging
    n:=0
    while next (R_i-S_j) in table decreases the overall entropy of h
        for each a_k in C_key
            calculate h_{n+1}(a_k) from h_n(a_k) and h_ij
        end for
        calculate entropy increase for h_{n+1}
        n := n+1
    endwhile
output :
        h_n, the approximate correspondence between
        C_key and D_key
```

APPENDIX 2

Implementation and Testing

The above algorithm has been implemented as a prototype.

A number of tests have been performed on small datasets describing restaurants (3 datasets) and films (2 datasets). For illustration purposes we have used two xml datasets describing restaurants (denoted dbX and dbY below) to test the method. These are derived from a classified directory and an online source, and have the following data:

| | | |
|---|---|---|
| dbX | Name, | 204 entries |
| | TelNo, | |
| | Addr, | |
| | FoodType, | |
| | Meal, | |
| | TextLine (optional) | |
| dbY | name, | 426 entries |
| | phone, | |
| | heading, | |
| | textline (optional, may be multiple lines) | |

Manual comparison suggests there are about 150 common entries e.g.

| dbX129 | | dbY165 | |
|---|---|---|---|
| Name | the george | name | the george at hintlesham |
| TelNo | 01473 652408 | phone | 652408 |
| Addr | george st hintlesham ipswich suffolk ip8 3nh | textline | george the, george st hintlesham |
| FoodType | pubs european english | textline | traditional ales & fine food |
| Meal | dinner breakfast lunch | heading | public houses |
| TextLine | english pub | | |

The chosen mapping functions were straightforward.

| Phone / TelNo |
|---|
| <area code> <number> matches <area code> <number> |
| <area code> <number> matches <number>   and vice versa |
| <number1> partially matches <number2> if they differ by permutation of two digits |
| degree of match = proportion of digits in the "correct" position |

Text Strings

String Str1 is an approximate subset of Str2 if Str1 is shorter than Str2 and most words in Str1 are also in Str2.

Str1 is an approximate permutation of Str2 if they have a high proportion of common words:

degree of match=proportion of common words, must be at least two.

Both ignore "stop" words such as the, and, etc.

Results

Mapping from dbX to dbY, the average maximum matches between domains are:

| dbX attribute | dbY attribute | average using max in LPD |
|---|---|---|
| TelNo | phone | 65% |
| Name | name | 60% |
| Name | textline | 55% |
| Addr | textline | 39% |

On the basis of telephone number matching, 72 entries out of the 204 in dbX are unassigned, 131 appear to have a perfect match and one appears to have a perfect match with two entries in the dbY database (this is actually correct, as the dbY database contains a duplicate entry). When names are also matched, 44 are unassigned, 18 partially match two or more dbY entries and 142 match a single entry.

Examples of matches which are not certain:

| dbX128 | |
|---|---|
| Name | moon & mushroom inn |
| TelNo | 01473 785320 |
| Addr | high rd swilland ipswich suffolk ip6 9lr |
| FoodType | pubs european english |
| Meal | dinner breakfast lunch |
| TextLine | english pub |

| dbY171 | |
|---|---|
| name | half moon inn |
| phone | 785320 |
| textline | half moon inn high rd swilland witnesham |
| heading | public houses |

$Pr(h(dbX128) = dbY171) = 1$ matching TelNo and phone $= 0.74$ also matching Name and name $= 0.6$ also matching Name and textline $= 0.5$ also matching Addr and textline

| dbX86 | |
|---|---|
| Name | pizza hut uk ltd |
| TelNo | 01473 604770 |
| Addr | upper brook st ipswich suffolk ip4 1du |
| FoodType | pizza european |
| Meal | lunch dinner |
| TextLine | pizza |

| dbY51 | |
|---|---|
| name | pizza hut |
| phone | 216922 |
| heading | food-delivered |
| textline | pizza hut uk ltd 45-49 upper brook st ipswich |

$Pr(h(dbX86) = dbY51) = 0$ matching TelNo and phone $= 0.5$ also matching Name and name $= 0.6$ also matching Name and textline $= 0.7$ also matching Addr and textline The system recognises a match even though the most reliable indicator (TelNo→phone) is wrong in this case. The system appears to be reasonably robust against errors e.g.

| dbX8 | |
|---|---|
| Name | hilton fish bar |
| TelNo | 01473 727510 |
| Addr | 378 bramford rd ipswich suffolk ip1 5ay |
| FoodType | european fish and chips |
| Meal | lunch dinner |
| TextLine | |

| dbY28 | |
|---|---|
| name | fish net the |
| phone | 727510 |
| heading | fish & chip shops & restaurants |
| textline | fish net the 385 spring rd ipswich |

Figure 4:
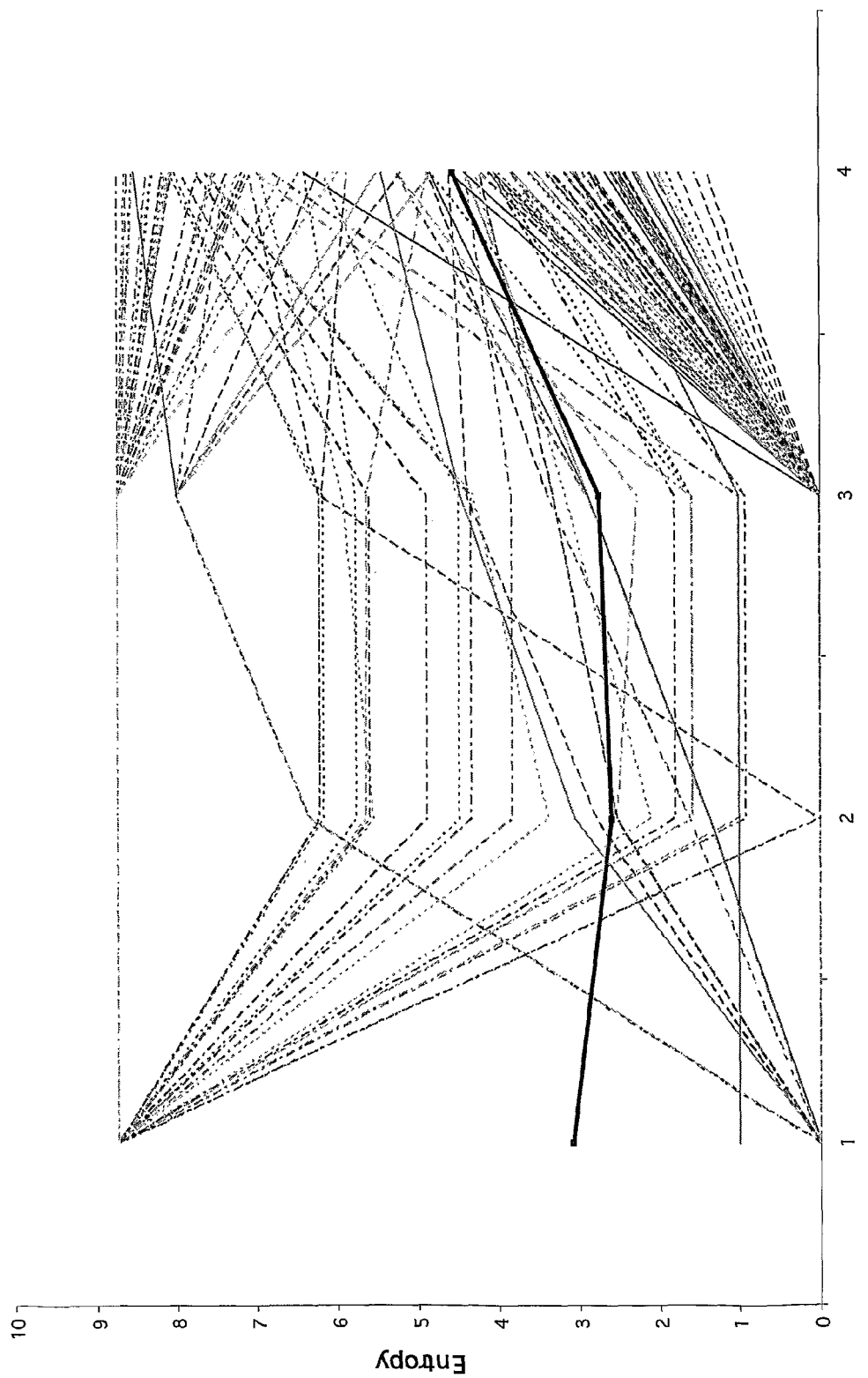
FIG. 4 is a graph showing the evolution of individual matches for the example implementation set out in Appendix 2.

$Pr(h(dbX8) = dbY28) = 1$ matching TelNo and phone $= 0.38$ also matching Name and name $= 0.15$ also matching Name and textline $= 0.2$ also matching Addr and textline FIG. 4 shows the evolution of individual matches by measuring the entropy of the mapping h for individual elements in the xmldb. dataset. An entropy of 0 represents a perfect match; an entropy of 8.7 means the entry matches the whole domain. The thick line shows the average entropy. This suggests that the best approximation is after 2 or 3 matched attributes.

The invention claimed is:

1. A method of operating a database management system for integrating data from a plurality of data sources, said data sources being at least partially structured and comprising data objects each comprising data relating to one or more attributes of an entity; said method comprising steps of:
   (a) selecting, for each of a first and a second data source, an initial attribute or combination of attributes;
   (b) automatically selecting, in respect of said attributes or combinations of attributes of said first and second data sources, a candidate matching function from a set of possible matching functions, said matching functions relating to possible mappings between data relating to one or more attributes in said first data source and data relating to one or more attributes in said second data source;
   (c) applying said candidate matching function to data relating to said selected attribute or combination of attributes in said first data source to create possible data relating to said selected attribute or combination of attributes in said second data source;
   (d) deriving, from said possible data and from actual data in said second data source a disparity measure relating to an amount of disparity therebetween;
   (e) automatically selecting one or more different candidate matching functions from said set of possible matching functions, and repeating steps (c) and (d) in respect thereof;
   (f) establishing, from said candidate matching functions, a candidate matching function having a disparity measure indicative of the lowest amount of disparity, and designating said candidate matching function as a probable candidate matching function;

(g) selecting, for each of said first and second data sources, one or more further attributes or combinations of attributes, and performing steps (b) to (f) in respect thereof whereby to establish probable candidate matching functions in respect thereof; and (h) determining, with reference to one or more of said established probable candidate matching functions, a probable correspondence between data objects of said first data source and data objects of said second data source.

2. A method of operating a database management system according to claim 1 wherein said matching functions are selected from a set of predetermined matching functions.

3. A method of operating a database management system according to claim 1 wherein said matching functions are selected from a set of matching functions derived by a machine-learning system.

4. A method of operating a database management system according to claim 1, further comprising a step of identifying, in dependence on disparity measures derived in relation to previously-selected matching functions, one or more more-specific matching functions.

5. A method of operating a database management system according to claim 1, wherein the step of selecting said initial attributes or combinations of attributes comprises selecting one or more key attributes, said key attributes being attributes having a high cardinality relative to other attributes.

6. A method of operating a database management system according to claim 1, wherein said set of possible matching functions includes matching functions which relate to possible mappings between data relating to one or more attributes or combinations of attributes in said first data source and fuzzy sets of elements relating to one or more attributes or combinations of attributes in said second data source.

7. A method of operating a database management system according to claim 1, wherein said step of determining a probable correspondence between data objects of said first data source and data objects of said second data source comprises comparing fuzzy sets of elements relating to data objects of said first data source and data objects of said second data source.

8. A method of operating a database management system according to any of the preceding claims, further comprising a step of including one or more data objects from one of said first and second data sources into the other of said first and second data sources.

9. A method of operating a database management system according to claim 1, further comprising a step of creating a combined data source including one or more data objects from said first data source and one or more data objects from said second data source.

10. A method of operating a database management system according to claim 1, wherein different candidate matching functions are selected in turn from said set of possible matching functions until such time as a determination is made that selection of further different candidate matching functions is unlikely to lead to the selection of a further candidate matching function having a disparity measure indicative of the lowest amount of disparity.

11. A database management system for integrating data from a plurality of data sources, said data sources being at least partially structured and comprising data objects each comprising data relating to one or more attributes of an entity; said system comprising:

(a) means for selecting, for each of a first and a second data source, an initial attribute or combination of attributes;

(b) means for automatically selecting, in respect of selected attributes or combinations of attributes of said first and second data sources, a candidate matching function from a set of possible matching functions, said matching functions relating to possible mappings between data relating to one or more attributes in said first data source and data relating to one or more attributes in said second data source;

(c) means for applying a selected candidate matching function to data relating to said selected attribute or combination of attributes in said first data source to create possible data relating to said selected attribute or combination of attributes in said second data source;

(d) means for deriving, from said possible data and from actual data in said second data source a disparity measure relating to an amount of disparity therebetween;

(e) means for automatically selecting one or more different candidate matching functions from said set of possible matching functions, and arranging for the or each of said different candidate matching functions to be treated by means (c) and (d);

(f) means for establishing, from said candidate matching functions, a candidate matching function having a disparity measure indicative of the lowest amount of disparity, and designating said candidate matching function as a probable candidate matching function;

(g) means for selecting, for each of said first and second data sources, one or more further attributes or combinations of attributes, and arranging for the or each of said further attributes or combinations of attributes to be treated by means (b) to (f) whereby to establish probable candidate matching functions in respect thereof; and (h) means for determining, with reference to one or more of said established probable candidate matching functions, a probable correspondence between data objects of said first data source and data objects of said second data source.

12. A database management system according to claim 11 wherein said means for selecting a candidate matching function is arranged to select from a set of predetermined matching functions.

13. A database management system according to claim 11 wherein said means for selecting a candidate matching function is arranged to select from a set of matching functions derived by a machine-learning system.

14. A database management system according to claim 11, further comprising means for identifying, in dependence on disparity measures derived in relation to previously-selected matching functions, one or more more-specific matching functions.

15. A database management system according to claim 11, wherein the means for selecting said initial attributes or combinations of attributes comprises means for selecting one or more key attributes, said key attributes being attributes having a high cardinality relative to other attributes.

16. A database management system according to claim 11, wherein said set of possible matching functions includes matching functions which relate to possible mappings between data relating to one or more attributes or combinations of attributes in said first data source and fuzzy sets of elements relating to one or more attributes or combinations of attributes in said second data source.

17. A database management system according to claim 11, wherein said means for determining a probable correspondence between data objects of said first data source and data objects of said second data source comprises means for comparing fuzzy sets of elements relating to data objects of said first data source and data objects of said second data source.

18. A database management system according to claim 11, further comprising means for including one or more data objects from one of said first and second data sources into the other of said first and second data sources.

19. A database management system according to claim 11, further comprising means for creating a combined data source including one or more data objects from said first data source and one or more data objects from said second data source.

20. A database management system according to claim 11, wherein said means for selecting one or more different candidate matching functions is arranged to select different candidate matching functions in turn from said set of possible matching functions until such time as a determination is made that selection of further different candidate matching functions is unlikely to lead to the selection of a further candidate matching function having a disparity measure indicative of the lowest amount of disparity.

* * * * *